United States Patent [19]
Bingley

[11] 3,764,887

[45] Oct. 9, 1973

[54] VECTOR ADDITION SINE WAVE POWER CONTROL USING SINGLE INVERTER AND RETURN OF ENERGY TO INVERTER SOURCE

[75] Inventor: Donald W. Bingley, Chelmsford, Mass.

[73] Assignee: Raytheon Company, Lexington, Mass.

[22] Filed: Apr. 27, 1972

[21] Appl. No.: 248,266

[52] U.S. Cl. .................. 321/45 R, 307/54, 321/20
[51] Int. Cl. .......................................... H02m 7/48
[58] Field of Search .............. 307/66, 87; 321/45, 321/27 MS

[56] References Cited
UNITED STATES PATENTS

| | | | |
|---|---|---|---|
| 3,278,827 | 10/1966 | Corey et al. | 321/27 MS |
| 3,389,268 | 6/1968 | Jamieson et al. | 307/87 X |
| 3,406,327 | 10/1968 | Mapham et al. | 321/45 |

*Primary Examiner*—William M. Shoop, Jr.
*Attorney*—Milton D. Bartlett et al.

[57] ABSTRACT

An alternating current power supply control circuit utilizing a single sine wave inverter having a sine wave output which is derived from a DC source which presents a constant voltage to a load, is coupled to an unregulated AC supply voltage to add or subtract therefrom an incremental voltage required for regulation of the AC supply voltage. Unwanted or excess energy in the inverter is returned to the DC source to conserve power and prevent voltage build up in the inverter. The resultant output voltage which, if desired, may be converted by rectification to DC is compared with a desired voltage reference to generate an error signal to control the relative phase of the sine wave output of the inverter with respect to the phase of the supply voltage to achieve a regulated power supply.

11 Claims, 3 Drawing Figures

PATENTED OCT 9 1973  3,764,887

VECTOR ADDITION SINE WAVE POWER CONTROL USING SINGLE INVERTER AND RETURN OF ENERGY TO INVERTER SOURCE

BACKGROUND OF THE INVENTION

This invention relates to inverter power supplies of the type which provide a sine wave output and, more particularly, to a conservation of energy circuit in a power supply which utilizes a sine wave inverter operating in conjunction with an alternating current supply line or source to provide vector control of the sine wave output of the alternating current source.

The regulation of electrical power is recognized as a basic requirement throughout industry, whenever electrical power is utilized. The decision on the type of regulator chosen to meet a particular set of requirements will have to take into consideration basic requirements such as size, weight, operating range, efficiency and cost. Many alternating current regulators have used proprotional phase control of silicon control rectifiers for regulation of sine wave alternating current. However, regulation of this type has generally resulted in noise and ringing due to steep wavefronts as well as serious distortion of the waveform output due to the interruption caused by switching on and off of the silicon control rectifiers. Other alternating current regulators, such as, for example, those utilizing an autotransformer having phase controlled silicon control rectifiers in series with its primary or common winding, require extensive smoothing devices, such as swinging and filter chokes, to suppress noise and ringing and to smooth the alternating current output. This arrangement results in more complex and expensive equipment for a given degree of freedom from output wave distortion. Other regulating devices, such as magnetic amplifiers, suffer both in weight and distortion of waveforms.

On the other hand, inverters utilizing silicon control rectifiers as the switching means, usually do not provide line regulation. When supply or line regulation is required, the power supply is often incapable of compensating for or handling a given variation in the input line voltage. This becomes particularly a problem when load changes result in a large variation of SCR voltages or when a supply is required to handle or control the full output power from the aternating current source to a load, and, for example, either the input voltage varies down to a substantially lower value or the load becomes substantially greater, resulting in a high Q condition which increases the voltage across the SCR's. This presents a particular difficulty when, for example, an inverter is used in connection with a buck-boost circuit to regulate line voltage in the presence of a relatively heavy load. In this instance, for example, in the buck mode, power flows back from the line into the inverter circuit and must be dissipated or removed in some manner to prevent eventual burn out of the SCR's. Thus when a heavy load is being controlled in the buck mode, sufficient energy from the line being regulated is returned to the inverter, such as by well known transformer action, to seriously disrupt the operation of the SCR's resulting in failure of the power supply. To contain or dissipate this undesirable reverse flow of energy, oversized and generally costly components or elaborate protective circuitry is frequently utilized, adding to the cost and inefficiency of the power supply. In addition, reverse current buildup normally flowing in the opposite direction to that of the SCR's also presents an additional load on the SCR's unless some means is provided to dissipate or remove this unwanted current from the inverter circuit.

Also, the usual inverter circuit frequently has poor load regulation and inability to operate with an open-circuited load, particularly in circuits wherein the inverter capacitor is connected in series with the load to present a constant current source to the load. In such instances, the inverter becomes overloaded and approaches an unbalanced condition in which one or more silicon control rectifiers become damaged resulting in further overloading and output failure. Another difficulty associated with inverters of this type is due to rapid changes in the phase of the input power to the inverter which must rapidly change its phase to compensate for the distorted or transient laden input wave. Many of such inverters simply cannot control over a relatively wide range of input power variation, such as 25 to 50 percent. Accordingly, such inverters and aforementioned regulating devices must handle the full range of line variation to achieve adequate power control, and thus require greater power handling capability.

It is, therefore, an object of the invention to provide an improved regulator which overcomes the above disadvantages in that it provides regulation for line variation without distorting the output waveform. It is a further object of the invention to provide an improved regulator which can control a wide range of output power without the usual problems associated with power reflected back into the inverter from the line or with transients or variations in line or load.

Another object of the invention is to provide an improved regulator which is required to regulate only the mean or average of the normal maximum variation in input power to provide the desired range of regulated output power.

It is a further object of the invention to provide an improved regulator which utilizes only a single sine wave inverter to regulate over the desired range of output power with maximum efficiency and with a minimum number of components, and which makes efficient use of power flowing into the inverter during regulation of a heavily loaded line.

SUMMARY OF THE INVENTION

In accordance with the alternating current regulator of the invention, the output of an alternating current line or source is regulated by a single sine wave inverter which utilizes a pair of serial connected inductors connected in series with a pair of solid-state switching devices, such as silicon control rectifiers, and which is connected to a source of direct current and an inverter capacitor connected in parallel with the common junction of the inductors to produce across said junction a sine wave output signal. The source of direct current can be obtained by rectifying the alternating current source. The sine wave output of the inverter is taken across the parallel resonant circuit and is coupled, such as by a transformer, to the alternating current line and is made to vary in phase with respect to the phase of the alternating current line to add or subtract vectorially an incremental voltage required to regulate the line voltage. Excess energy flow entering the inverter from the line by way of the coupling device is returned to the source of direct current as is reverse current used to commutate the solid state switching devices. The phase of the sine wave output voltage of the inverter is varied by sensing the amplitude of the alternating current line and by comparing the sensed voltage with a desired level of reference voltage to provide an error signal, the phase of which is compared with the reference phase of the alternating current line to provide a variably timed trigger signal which varies the phase of the sine wave output of the inverter with respect to that of the line and thus vectorially adds or subtracts the required incremental voltage from the alternating current line to achieve regulation.

In its broader sense, the invention contemplates a sine wave inverter producing a substantially pure sine wave across a parallel resonant circuit formed by inductors through which inverter current intermittently flows and a capacitor connected in shunt with the inductors. The output of the sine wave inverter which is taken across the parallel resonant circuit is made to vary in phase with respect to an unregulated alternating current line or supply to which it is coupled so as to add or subtract an incremental voltage required to reglate the line voltage. Energy in the form of reverse current resulting from the regulation is returned to the source of power for the inverter to provide protection of the inverter from unwanted voltage build up. The phase of the voltage output of the inverter is made to vary with respect to line voltage by comparing the sensed line voltage with a reference voltage in order to control the value of the inverter voltage which is to be added or subtracted from the line.

BRIEF DESCRIPTION OF THE DRAWINGS

For a better understanding of the present invention, together with other and further objects thereof, reference is made to the accompanying drawings in which.

DESCRIPTION OF THE PREFERRED EMBODIMENT

Figure 1:
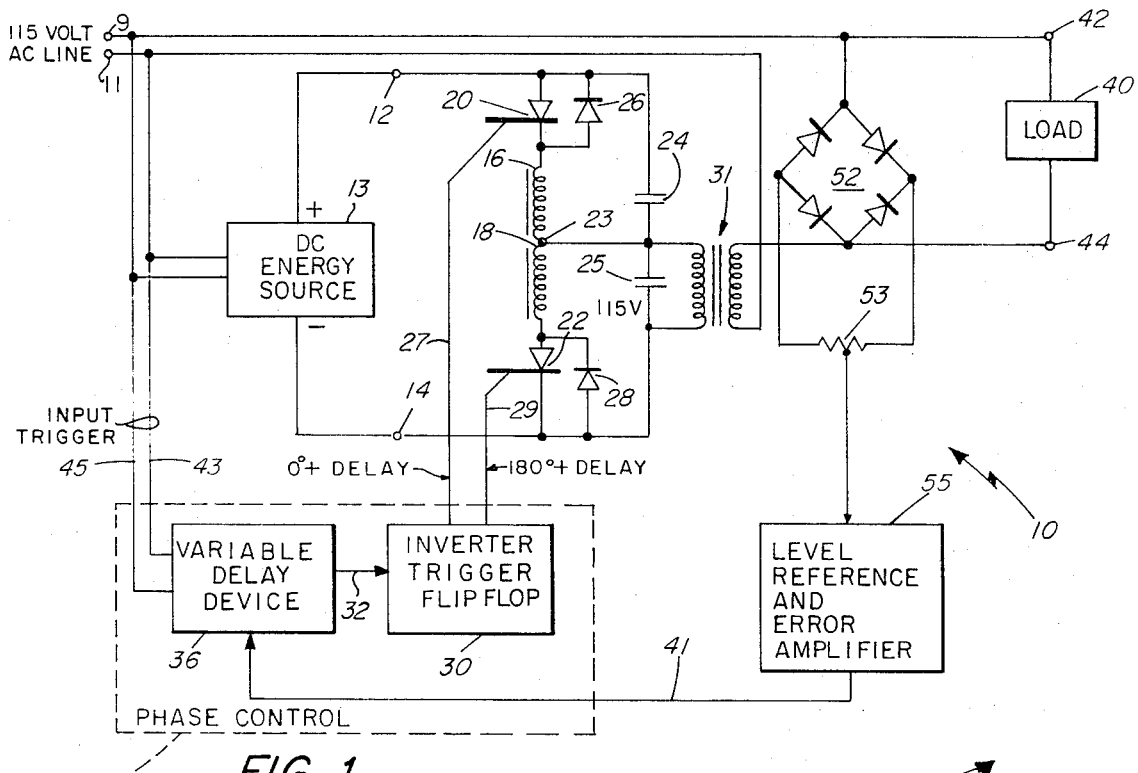
FIG. 1 is a schematic diagram of an inverter power supply circuit embodying features of the invention.

Referring now to FIG. 1, there is shown a voltage regulated sine wave inverter circuit 10 for regulating the output of an alternating current line or source at terminals 9 and 11. An unregulated source of unidirectional current, such as shown by DC energy source 13 is provided with a positive terminal 12 and a negative terminal 14 for supplying direct current to an inverter circuit. DC energy source 13 can be an independent source, or, as shown, it can be connected to the AC line terminals 9 and 11 and include a conventional rectifier and filter, not shown. Connected across terminals 12 and 14 is the inverter circuit portion of the alternating current regulator which includes inductors 16 and 18 connected in series with two switches in the form of silicon controlled rectifiers, for convenience herein referred to as SCR's. These SCR's can be, for example, type C158. In particular, SCR 20 and SCR 22 are connected in series with inductor windings 16 and 18 across terminals 12 and 14. As shown, these windings are not inductively coupled.

A capacitor 24 is connected from the common junction of inductors 16 and 18 to the positive side of DC energy source 13 and capacitor 25 is connected from the common junction of inductors 16 and 18 to the negative side of the DC energy source. These capacitors form LC circuits with inductors 16 and 18 when SCR's 20 and 22 are alternately triggered into conduction at the preferred 10 kilohertz rate. A sine wave output synchronized with the line voltage is obtained from terminal 23 and either terminal 12 or 14 and, in the present embodiment, the sine wave output appearing across capacitor 25 is connected to the primary of a line regulating transformer 31 to provide the incremental voltage to regulate the 115 volt line in a manner to be described. After the SCR's are alternately triggered, inductor current flows into the LC circuit comprising inductor 16 on the positive side and capacitors 24 and 25, and inductor 18 and capacitors 24 and 25 on the negative side. This parallel capacitor arrangement presents a constant voltage source to the load, and permits stable operation from zero load to full load. The LC circuit has a value of reactance to resonate, preferably, at 1.35 times the trigger rate, this ratio being selected for optimum purity of sine wave output at terminal 23.

To trigger the SCR's of the inverter, a conventional flip flop 30 produces pulses on alternate half cycles in output lines 27 and 29. The trigger flip flop 30 in this embodiment is energized by a variably occurring timing pulse on line 32 which delays the triggering of the SCR's and the sine wave produced thereby with respect to the sine wave occurring on the AC line for regulation of the AC line. Also connected across SCR's 20 and 22 are reverse current recovery diodes 26 and 28. After an SCR, such as SCR 20, is triggered, the LC circuit of inductor 16 and capacitors 24 and 25 ring, and the SCR is "turned off" when the current reverses. The reverse current flows toward the power source through the rectifier diode 26, back biasing the SCR 20 by its forward drop. Reverse current due to ringing of the LC circuit along with energy returned to the inductor windings from the alternating current line due to transformer action, particularly when the inverter is subtracting from the line voltage, is thus returned to the DC energy source by the reverse recovery diodes where it conserves power by augmenting the voltage level of the DC source. The diodes, by carrying the negative going current, provide protection for their associated SCR's by limiting the peak reverse voltage across an SCR to no more than a volt or two. As a result, more expensive heavy duty switches and related components are not required, and, if desired, even higher efficiency can be obtained by utilizing an inverter, not shown, to direct the energy returned to the DC source back to the AC line or utlimate source. After the reverse recovery diode 26 has stopped conducting, the diode SCR combination is "off" until a trigger is applied. The recovery time available to the SCR is the period that the reverse recovery rectifier conducts. This time is governed by the LC circuit, and the load condition. A higher resistive or inductive load detracts from the recovery time. However, in the present circuit, recovery time is the natural period required by the SCR and is extended over a substantial part of the half cycle, and remains substantially constant from no load to full load of the inverter. Thus, the inverter circuit, sometimes referred to as a half-bridge configured circuit, operates from the 150 volt DC energy source to produce a relatively pure sine wave output at terminals 23 and 14 of the same frequency as the input line. Since a pure sine wave is thus produced, an output filter is not required across terminals 42 and 44.

A further detailed description of this stable unregulated half-bridge type inverter is described in an article "SCR's Break the Frequency Barrier" by Nevill Mapham at page 94 of the Sept. 6, 1965, issue of Electronics published by McGraw-Hill. The present invention discloses the utilization of a single sine wave inverter stage for one sine wave and the unregulated alternating current line at terminals 9 and 11 as the other sine wave. This latter sine wave source is used to provide a reference input trigger pulse to a conventional variable pulse delay device 36, such as, for example, the delay device shown in FIG. 2. This delay device is used to shift the phase of the relatively pure sine wave output of the inverter stage fed to a coupling device herein shown as the primary of transformer 31 with respect to the phase of the AC line sine wave appearing across the secondary of transformer 31 and thus add or subtract from the secondary, a voltage increment due to the delay or phase difference between the sine wave reference input to delay device 36 and the output from inverter trigger flip flop 30 on lines 27 and 29. Energy reflected back into the inverter from the alternating current line is returned to the DC energy source for the inverter to provide efficiency and protection of the inverter circuit.

According to the invention, when the trigger outputs on lines 27 and 29 from the conventional trigger flip flop device 30 are delayed a particular time with respect to the reference trigger input to the variable delay device 36 from the AC line, the sine wave output of the inverter stage into the primary of the conventional transformer 31 is delayed with respect to the sine wave voltage of the AC line across the secondary of the transformer. As a result, the difference due to this delay is vectorially added or subtracted from the secondary voltage. When the output of the SCR inverter stage is delayed according to input line and output load variations, an average or mean compensating voltage is provided to regulate the output of the AC line across terminals 42 and 44. At the same time, the sine wave inverter output is taken across the aforementioned LC resonant circuit to present a constant voltage source to the load, thus providing accurate regulation under no load or heavy load conditions.

The trigger output on line 27 for SCR 20 is thus timed from the zero degree reference pulse on line 32 plus the delay. On line 29 the output trigger for SCR 22 occurs at 180° of the output frequency plus the variable delay from delay device 36. The delay of variable delay device 36 does not exceed 180° of phase shift and is the amount of delay determined by a control signal on line 41 which varies the delay of variable delay device 36 to compensate for variations in input source 36 as fed by the AC line at terminals 9 and 11 or for variations in load 40. To achieve this, the alternating current output voltage at terminals 42 and 44, in this embodiment, is rectified to direct current by a conventional full wave diode bridge-rectifier 52 to provide a variable voltage drop across resistor 53. This voltage is sensed and compared with a fixed reference voltage source, not shown, in a well-known level sensor and error amplifier 55 to provide a control signal on line 41 when the voltage into level sensor 55 exceeds a preset reference voltage included therein. This reference voltage can be set to provide the desired output voltage into load 40 according to well-known power supply requirements, or it can be an external control signal in open loop configuration. Thus, the phase control for the inverter stage can, if desired, be contained in a single phase control device 35 which includes the variable delay device 36 and trigger flip flop 30, thereby providing the required phase shift of the sine wave inverter stage with respect to the AC line to provide stable and accurate regulation thereof by adding or subtracting from the AC line a substantially pure sine wave from the inverter representing only the mean or average voltage increment required to achieve such regulation.

In addition, energy reflected back into the inverter and excess reverse energy in the ringing circuit is conducted back to the DC energy source by diodes 26 and 28 poled in a direction to render their associated SCR's nonconducting and to protect the SCR's from blow out by preventing a dangerous build up of peak reverse voltage across the SCR's. This represents an improvement over presently used circuits utilizing a single inverter or multiple inverters producing stepped waves or approximation of sine waves to add or subtract energy with relation to another sine wave source with no protective provision for return of unused or unwanted energy toward the DC source. A typical presently used circuit of this type is shown, for example, in U.S. Pat. No. 3,419,788 issued to J.C. May on Dec. 31, 1968.

Figure 2:
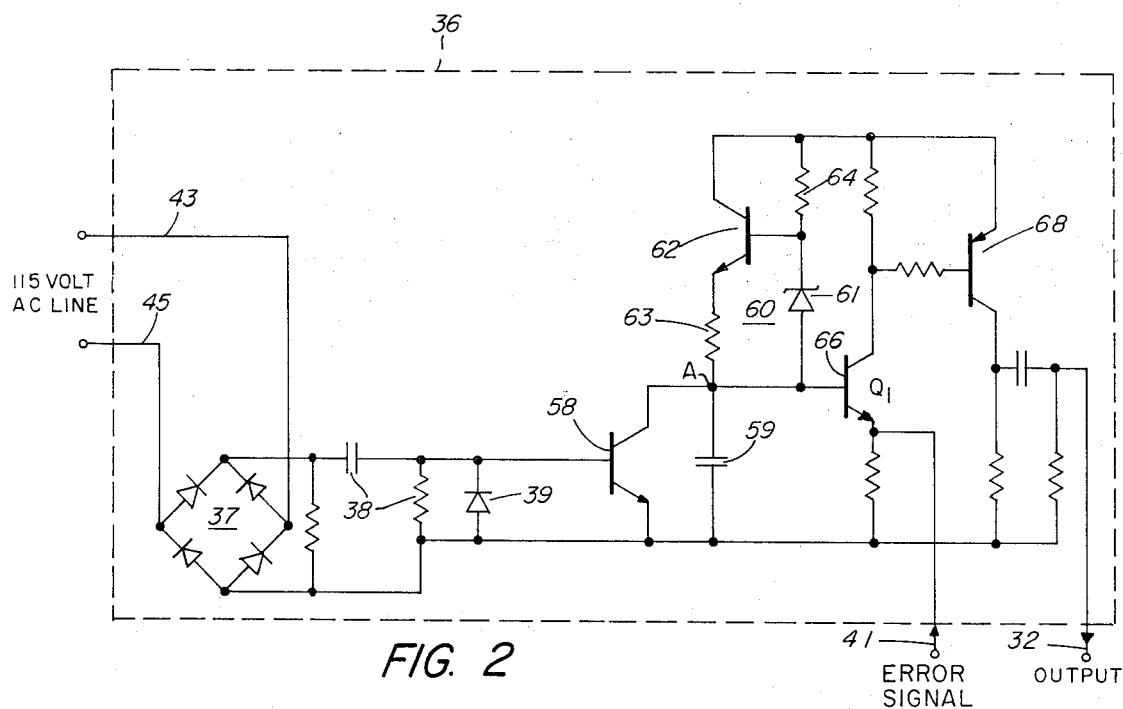
FIG. 2 is a schematic diagram of a particular phase shifter used to delay the triggering of one source of alternating current from the sine wave inverter with respect to the other source of alternating current, such as the AC line.

Referring now to FIG. 2, there is shown a ramp circuit for providing a delay of the error signal on output line 32 to inverter trigger flip flop 30 shown in FIG. 1. The delay is achieved by feeding a reference signal on lines 43 and 45 into variable delay device 36. The AC signal is rectified in full wave rectifier 37 and differentiated in a well-known manner by an RC circuit 38 in the input circuit of delay device 36. Diode 39 prevents excess reverse voltage to transistor 58 of the delay device. This input circuit is connected to alternating current lines 43 and 45. The differentiated AC input reference signal is applied in the form of a pulse to the base of transistor 58 which conducts to discharge capacitor 59 which has been charged from a well-known constant current source 60 which includes reference zener diode 61, transistor 62 for regulating the voltage across resistor 63. Resistor 64 provides bias for transistor 62. Transistor 58 provides at point A a zero degree reference point for the ramp voltage, as capacitor 59 charges. This ramp voltage is applied to the base of comparator transistor 66. Whenever the ramp voltage at point A and the base of transistor 66 exceeds the voltage level of the error signal applied to the emitter of transistor 66 by way of line 41, transistor 66 switches and provides an output to the base of transistor amplifier 68 which is delayed by a time interval depending upon how far the ramp voltage had to increase before it exceeded the error signal on line 41. This delayed signal to the base of transistor 68 provides a square wave output at its collector, of an amplitude sufficient on line 32 to trigger inverter flip flop 30 at this delayed time determined by the time of occurrence of the control signal from level reference and error amplifier 55. SCR's 20 and 22 of FIG. 1 are thus triggered at the corresponding delayed times to provide across the LC resonant circuit at terminal 23 the sine wave voltage increment required with respect to the AC line input voltage at terminals 9 and 11 to compensate for a change in output voltage at terminals 42 and 44.

Figure 3:
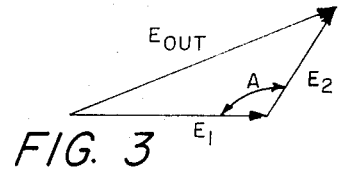
FIG. 3 is a vector diagram of the voltage inputs and the output of the inverter circuit.

In operation, therefore, the vectorial summation by transformer 31 of FIG. 1 of a sine wave AC line voltage with the identical frequency sine wave output of the SCR inverter stage, results in a voltage across the secondary of transformer 31 which is greater by a predetermined percent of the AC line voltage, when the two are in phase, and subtracts a voltage increment from the AC line voltage when the two are 180 electrical degrees are out of phase. FIG. 3 is a vector diagram showing the AC line voltage $E_1$ and the inverter incremental voltage $E_2$ as combined to provide a resultant output voltage $E_{OUT}$ as the phase relationship of angle A is changed. The incremental voltage $E_2$ may be added, as shown, to increase the line voltage or it may be subtracted from the AC line voltage to decrease the AC line voltage, and thus to compensate for variation in the unregulated line. $E_{OUT}$ equals the vector summed output voltage, $E_1$ and $E_2$. This holds true for the summation of two sine waves of the same frequency whether they be provided by individual inverters, or whether, as shown herein, they are a combination of sine waves from an AC line and that of the output of a sine wave inverter. This, when the two sine waves are connected such that their output voltages are summed, and when the frequency of the two are in synchronism, a relative phase shift between the two results in a variation of the output, as previously described. In addition, since the incremental inverter voltage to be summed with the AC line voltage, can be either in phase or out of phase a given amount, the incremental voltage is thus a difference voltage which is either added to or subtracted from the AC line, thereby permitting a smaller percentage of the AC line voltage, say 10 percent, to compensate for or regulate a voltage variation of approximately 20 percent. In this manner, since the regulator has only to control the mean of the normal maximum variation, the efficiency and operating range of regulation of one alternating current source, herein the AC line voltage, is achieved with a minimum amount of power used to provide this regulation. The inverter can readily tolerate a poor power factor on the AC line when this arrangement of vector summing is used. A closed loop control circuit results from sensing the amplitude of the output voltage variation of the AC line in comparison with a preset reference source to provide an error signal which shifts the phase relation between the AC line and the output of the inverter stage.

In the circuit of FIG. 1, for example, when trigger pulses referenced to the AC line and at the same frequency are applied to SCR 20 at zero degrees with respect to the AC line, current flows from DC energy source 13 through the LC circuit including inductor 16 and capacitors 24 and 25. The capacitors charge up toward twice the voltage of the energy source and a ringing condition occurs in which current flows in the reverse direction to the source through diode 26 and discharges capacitors 24 and 25 to back bias SCR 20 by its forward drop. SCR 20 thus turns off at its natural turn off time which is prior to the time the reverse recovery diode is reverse biased. SCR 20 is thus given a period in which to commutate which is a large proportion of the full 180° of the output frequency before its associated SCR 22 turns on. The recovery time available to the SCR 20 is the period that the reverse recovery diode conducts, and thus time is governed by the LC circuit and whether the load is resistive or reactive. The time at which SCR 20 turns on does not impair the commutation of SCR 22 inasmuch as it is effectively decoupled from SCR 20 and responds to a separate trigger on line 29 occurring at 180° with respect to the trigger for SCR 20, thus providing a clean sine wave output at terminal 23. Thus, the triggers for the inverter are referenced to the prime power or AC line and are of the same frequency. The phase of the triggers to the SCR's, and hence the inverter, is shifted with respect to the pre power phase, in response to a signal from the error amplifier. This error amplifier amplifies the error signal produced by the sensed output voltage change across rectifier bridge 52, as compared to the voltage reference, not shown, in level reference and error amplifier 52. When the output of the inverter stage at terminal 23 is in phase with the AC line across the secondary of transformer 31, then the line is increased by the amount of voltage in the primary winding. When the voltage in the primary winding is out of phase with the AC line, at 180°, as determined by triggering the SCR's, then the primary winding voltage will detract from or subtract from the line voltage. Energy reflected back into the inverter is returned to the inverter power source for protection of the SCR's and where it can be utilized again on the next operational cycle thus increasing the efficiency of operation. The intermediate points between full addition, in phase for zero degrees difference, and full subtraction, out of phase 180° difference, is achieved, with essentially infinite resolution. The result is a smooth control for the range of plus or minus variation of the primary winding of transformer 31. Since the load or transformer primary is effectively connected in parallel with the resultant LC circuit its inductive or capacitive characteristics have little effect upon the operation of the inverter, such as during no load condition. Also, unwanted energy which, for any reason is reflected back or enters the inverter, is diverted back to the energy source for the inverter where it can be utilized to increase the efficiency of the inverter or dissipated, such as by a bleeder resistor in shunt with the DC inverter source, in a manner which does not degrade the regulatory operation of the inverter, or returned from the DC source to the AC line, such as by an additional inverter. It should be understood that the present arrangement permits a plurality of inverters to be connected in parallel to provide greater power output and that the SCR trigger switches in the inverter can be replaced by transistors or other solid state switches which are provided with appropriate circuitry for rendering such devices conductive and nonconductive at times corresponding to the switching times of the SCR's. Inasmuch as the reverse energy in the inverter during commutation of the solid-state switches is returned toward the DC energy source for the inverter, no dangerous build up of excess energy occurs, the circuit is made insensitive to variation in the output load and thus provides trouble free operation in the presence of heavy loads without the tendency to burn out the solid-state switches and without additional power reducing components added to the circuits.

Accordingly, the foregoing disclosure and drawings are merely illustrative of the principles of the invention and are not to be interpreted in a limiting sense. The only limitations will be interpreted by the scope of the appended claims.

I claim:

1. In combination, an unregulated sine wave source, a sine wave inverter fed by a direct current source and including a parallel resonant circuit across which a sine wave output voltage is taken, means including a transformer having a primary winding coupled to said sine wave output voltage and a secondary winding coupled in series with said unregulated sine wave source for deriving a resultant output voltage from said inverter sine wave output voltage and said unregulated sine wave source, means for varying the phase relationship of said sine wave output voltage and said unregulated sine wave source with respect to the amplitude of their resultant output voltage, and means for returning to said direct current source energy entering said inverter from said unregulated sine wave source by way of said transformer.

2. In combination, an unregulated sine wave source, a source of direct current, a sine wave inverter coupled to said source of direct current and including serial-connected inductor windings connected by way of switching means to said source of direct current, a capacitor connected to form a parallel resonant circuit with said inductor windings, means including a transformer having a primary winding coupled to said sine wave inverter and said secondary winding connected in series with said unregulated sine wave source for coupling the output of said sine wave inverter to said unregulated sine wave source to produce a resultant output voltage, means for varying the phase of said sine wave inverter with respect to the phase of said unregulated sine wave source in response to said resultant output voltage, and means for returning to said source of direct current the energy entering said sine wave inverter from said unregulated sine wave source as a result of regulation thereof.

3. The combination as set forth in claim 2 in which the switching means comprises SCR's.

4. The combination as set forth in claim 2 in which the means for returning to said source of direct current the energy entering said sine wave inverter from said unregulated sine wave source includes a semiconductor diode connected in shunt with said switching means and poled in a direction to provide a voltage drop adapted to render said switching means nonconductive on alternate half cycles of the frequency of said resultant output voltage.

5. In combination, an alternating current supply circuit providing an unregulated voltage, a source of direct current, an inverter having a parallel resonant circuit across which appears an alternating current output voltage, means including a coupling device having a secondary winding connected in series with said unregulated voltage and a primary winding coupled to said alternating current output voltage for deriving from said alternating current output voltage and the unregulated voltage of said alternating current supply circuit a resultant output voltage, means for returning to said source of direct current reverse current used to commutate said inverter and energy entering said inverter from said supply circuit, and means including means for sensing said resultant output voltage for maintaining said resultant output voltage substantially constant by varying the phase relationship of said alternating current output voltage of said inverter with respect to said unregulated voltage.

6. An inverter power supply comprising a source of direct current, an unregulated sine wave source, a sine wave inverter coupled to said source of direct current and including a parallel resonant circuit adapted to present a constant voltage output to a load, said parallel resonant circuit including a pair of serially-connected inductor windings, a semiconductor switch connected in series with the opposite end of each inductor winding and said source of direct current, a capacitor connected from the junction of said inductor windings and one side of said source of direct current, means including a diode connected in shunt with each semiconductor switch through which energy from said resonant circuit flows toward said source of direct current to back bias said semiconductor switch to nonconduction during its normal recovery period, means including a buck-boost transformer having a secondary winding coupled in series with said unregulated sine wave source and said load and a primary winding connected to said parallel resonant circuit for deriving a vectorial summed output signal from the unregulated sine wave source and the voltage output of said parallel resonant circuit, means for varying the phase relationship of said sine wave inverter with respect to that of said unregulated sine wave source to vary the amplitude of said summed output signal, said diode also coupled for returning to said source of direct current excess energy not used for commutation of said semiconductor switches flowing in said inverter from said unregulated sine wave source when said transformer is in the buck mode.

7. An inverter power supply comprising a source of direct current, an unregulated sine wave source, a sine wave inverter coupled to said source of direct current and including a parallel resonant circuit adapted to present a constant voltage output to a load, means including a buck-boost transformer coupled in series with said unregulated sine wave source and said load to provide a resultant output signal from the output of said inverter and said unregulated sine wave source, diode means coupled to return to said source of direct current the energy used to commutate said sine wave inverter and energy entering said inverter from said unregulated sine wave source by way of said buck-boost transformer, and means for delaying the output of said sine wave inverter with respect to said unregulated sine wave source to actuate said buck-boost transformer to add or subtract therefrom an incremental voltage to maintain substantially constant the amplitude of said resultant output signal.

8. In combination, a source of direct current, an inverter including a pair of serially-connected inductor windings, a semiconductor switch connected in series with the opposite end of each inductor winding and said source of direct current, a capacitor connected from the common junction of said inductor windings and one side of said source of direct current to provide a parallel resonant output, an unregulated source of alternating current, means including coupling means having a secondary winding coupled to said unregulated source of alternating current and a primary winding connected to the parallel resonant output for deriving a vectorial summed output signal from the unregulated source of alternating and the parallel resonant out-put of said inverter, means for back biasing each semiconductor switch and directing to said source of direct current the energy entering said inverter from said unregulated source of alternating current by way of said coupling means, means for comparing said output signal with a reference source to provide a control signal, and means in response to said control signal to delay the triggering into conduction of the semiconductor switches of said inverter to maintain the amplitude of said resultant output signal substantially constant.

9. An inverter power supply comprising a direct current source, a sine wave inverter circuit including a pair of serial-connected inductor windings, a semiconductor switch connected in series with each inductor winding and said direct current source to provide intermittent current flow through said inductor windings, a capacitor connected from the common junction of said inductor windings to one side of the direct current source to provide a resonant circuit upon triggering of said semiconductor switches, diode means connected in shunt with each of said semiconductor switches and poled in a direction to provide a voltage drop to back bias each semiconductor switch in response to reverse current flow through said diode means, an unregulated sine wave source having substantially the same frequency as said sine wave inverter circuit, an output circuit including an output terminal connected to the common junction of said serially-connected inductors and adapted to present a constant voltage source to a load, a coupling device having an output winding coupled in series with said unregulated sine wave source and said load and a primary winding for coupling said output circuit to said unregulated sine wave source for deriving a resultant output voltage, means in response to the amplitude of said resultant output voltage to delay the triggering of said sine wave inverter circuit to vary the phase thereof with respect to the phase of said unregulated sine wave source to maintain the amplitude of said resultant output voltage substantially constant, said diode means back biasing each semiconductor switch and returning to said direct current source the energy flowing in said inductor windings from said unregulated source by way of said coupling device.

10. The inverter power supply as set forth in claim 9 in which the direct current source is derived from rectification of said unregulated sine wave source.

11. The inverter power supply as set forth in claim 9 in which the coupling device is a transformer adapted to operate in the buck-boost mode with respect to said unregulated sine wave source.

* * * * *